United States Patent
Minemyer (12) 
(10) Patent No.: US 6,517,122 B1
(45) Date of Patent: Feb. 11, 2003

(54) CLAMSHELL COUPLING SYSTEM AND METHOD

(76) Inventor: John T. Minemyer, 4620 Enchanted Cir. N., Colorado Springs, CO (US) 80917-3108

(*) Notice: Subject to any disclaimer, the term of this patent is extended or adjusted under 35 U.S.C. 154(b) by 0 days.

(21) Appl. No.: 09/495,883

(22) Filed: Feb. 1, 2000

Related U.S. Application Data (60) Provisional application No. 60/118,579, filed on Feb. 5, 1999.

(51) Int. Cl.$^7$ .............................. F16L 35/00; F16L 17/00
(52) U.S. Cl. ....................................... 285/328; 285/373
(58) Field of Search ................................ 285/328, 373, 285/419, 382, 369, 420

(56) References Cited

U.S. PATENT DOCUMENTS

| | | | |
|---|---|---|---|
| 1,463,749 A | 7/1923 | Pollak | |
| 2,073,338 A | 3/1937 | Durkee | 285/194 |
| 2,346,051 A | 4/1944 | Seamark | 285/193 |
| 3,078,108 A | 2/1963 | Smith | 285/104 |
| 3,133,753 A | * 5/1964 | Goodman et al. | 285/419 X |
| 3,186,744 A | 6/1965 | Smith et al. | 285/373 |
| 3,387,864 A | 6/1968 | Walters | 285/23 |

(List continued on next page.)

FOREIGN PATENT DOCUMENTS

| | | | | |
|---|---|---|---|---|
| AT | OE 222 956 A | 8/1962 | | 471/7 |
| DE | 2 102 198 | 7/1972 | | |
| DE | 41 11 952 C | 4/1992 | | F16L/21/06 |
| EP | 0 650 007 A | 4/1995 | | F16L/55/17 |
| EP | 0 916 888 A | 5/1999 | | F16L/21/06 |
| EP | 0 997 678 A | 5/2000 | | F16L/21/06 |
| FR | 873844 | 7/1942 | | 5/3 |
| GB | 2 098 692 A | 11/1982 | | |
| IT | 26 1684 | * 12/1928 | | 285/419 |
| JP | 0072218 | 6/1978 | | 285/373 |
| PL | 139631 | 1/1980 | | F16L/15/00 |
| WO | WO 00 11390 A | 3/2000 | | F16L/21/06 |

OTHER PUBLICATIONS

PCT Written Opinion (PCT Rule 66), mailed Oct. 26, 2000 re International Application PCT/US00/02599 filed Feb. 1, 2000 (Applicant's reference 065571.0111).
PCT Written Opinion (PCT Rule 66), mailed Aug. 31, 2000, re PCT/US99/18951 filed Aug. 24, 1999, Applicant's reference: 065571.0107.
International Search Report dated Jun. 29, 2000 for International Application No. PCT/US00/02599.
International Search Report dated Feb. 15, 2000 for International Application No. PCT/US99/18951.
Lözon Solutions brochure.
Lözon Solutions, "Seal Lock™ Couplers".
Pending U.S. patent application Ser. No. 09/379,550, filed Aug. 23, 1999.

*Primary Examiner*—Robert J. Sandy
*Assistant Examiner*—Dinesh Melwani
(74) *Attorney, Agent, or Firm*—Baker Botts L.L.P.

(57) ABSTRACT

A clamshell coupling for a conduit system is provided. The clamshell coupling may comprise at least one longitudinal housing having first and second ends adapted to receive sections of conduit. A restraint system may be disposed on an interior surface of the longitudinal housing. The restraint system operates to actively engage at least one conduit and resist a longitudinal load between the clamshell coupling and the conduit. A coupling system may be used to secure the longitudinal housings to the tubular members.

7 Claims, 4 Drawing Sheets

U.S. PATENT DOCUMENTS

| | | | |
|---|---|---|---|
| 3,790,194 A | | 2/1974 | Kimberley ............... 285/373 |
| 4,236,736 A | | 12/1980 | Anderson ............... 285/150 |
| 4,352,512 A | * | 10/1982 | Janssen et al. ............ 285/419 |
| 4,538,839 A | | 9/1985 | Ledgerwood ............ 185/236 |
| 4,708,375 A | | 11/1987 | Sauer ..................... 285/258 |
| 4,850,622 A | | 7/1989 | Suzuki ................... 285/286 |
| 4,923,349 A | * | 5/1990 | Logsdon ................. 411/433 |
| 5,004,275 A | * | 4/1991 | Miller .................... 285/373 |
| 5,029,904 A | | 7/1991 | Hunt ...................... 285/24 |
| 5,120,083 A | | 6/1992 | Stine ...................... 285/31 |
| 5,141,258 A | | 8/1992 | Stine ...................... 285/31 |
| 5,228,724 A | | 7/1993 | Godeau ................... 285/93 |
| 5,234,234 A | | 8/1993 | Hearn .................... 285/328 |
| 5,286,067 A | | 2/1994 | Choksi ................... 285/38 |
| 5,324,150 A | | 6/1994 | Fullerton ................. 411/433 |
| 5,605,357 A | * | 2/1997 | Bud ....................... 285/15 |
| 5,709,417 A | | 1/1998 | Verbeck .................. 285/382 |
| 5,775,741 A | | 7/1998 | Rice et al. ................ 285/272 |
| 5,833,276 A | | 11/1998 | Thompson, Jr. .......... 285/38 |
| 6,059,321 A | | 5/2000 | Lyall, III ................. 285/24 |
| 6,276,726 B1 | * | 8/2001 | Daspit .................... 285/15 |

* cited by examiner

CLAMSHELL COUPLING SYSTEM AND METHOD

RELATED APPLICATION

The present application claims the benefit of U.S. Provisional Application serial number 60/118,579, entitled Clamshell Coupling, filed Feb. 5, 1999. The present application is related to co-pending U.S. patent application Ser. No. 09/379,550, entitled Radial Conduit Coupling System and Method, filed Aug. 23, 1999.

TECHNICAL FIELD OF THE INVENTION

The present invention relates generally to pipe fittings, and more particularly to a clamshell coupling system and method.

BACKGROUND OF THE INVENTION

Conduit systems are used in a number of industries and applications to form a passage(s) for communicating a media(s). For example, conduit systems are utilized in water and sewage plumbing systems; electrical wire and optic fiber conduit systems; hydraulic and pneumatic systems; as well as other devices and systems. The conduit system generally comprises a number of pipes that are connected together, or assembled, to form the conduit system. The pipe is often constructed from a plastic, such as rigid or plasticized polyvinyl chloride (PVC), and polyethylene. The pipe may be rigid or flexible, and is generally formed in relatively short lengths that must be joined together. In many applications a pipe coupling is used to join the pipes. Pipe couplings can be permanent or detachable. Conventional pipe couplings have several disadvantages. Many piping systems are "welded" together through a process called electro-fusion. This is an expensive and time consuming operation with many drawbacks. For instance, the melting points associated with pipes of different manufacturers may vary considerably thereby hindering the welding operation. Accordingly, skilled artisans are required to assemble piping components and the process must be adjusted continually as ambient temperature changes.

Conventional pipe couplings are often difficult to assemble and prone to failure. In addition, many do not form a tight seal between the pipe interior and ambient environment, thereby allowing the media to escape to the outside environment, or allowing the outside environment to contaminate the media. In general, conventional pipe couplings are difficult to install and assemble, thereby requiring expensive skilled artisans to construct the conduit system. Conduit systems provide an environmentally secure and protective passage for routing optic fibers from one location to another.

In one method of installation, a trench is dug and the pipe is inserted into the trench. A coupling may be used to attach additional pipes to the buried pipe and the construction process continues. In many instances, an obstacle, such as a roadway or the like, prevents a trench from being dug. In these instances, a small passage, or borehole may be excavated under the obstacle and the pipes and the associated couplings are pulled through the passage. The pulling action may create a longitudinal tension load between the couplings and their associated pipes. The pipes may be separated from their associated couplings when under an excessive longitudinal tension load. In many situations, the pipes and/or couplings are also rotated and pulled in order to get the pipes through a restricted passage. Rotating the pipes places a rotational load on the couplings and vice versa. The rotational load may also cause the tubular conduit to separate from the coupling.

SUMMARY OF THE INVENTION

Accordingly, a need has arisen in the art for an improved coupling. The present invention provides a clamshell coupling that substantially reduces or eliminates problems associated with prior systems and methods.

In accordance with one embodiment of the present invention, a coupling comprises at least one semi-tubular, longitudinal housing, having first and second ends which may be adapted to receive at least one section of conduit. The housing may include a first indented region forming a locking lug upon the exterior diameter of the housing. In one embodiment, a second semi-tubular, longitudinal housing, complimentary to the first housing, may be provided, having at least a second indented region forming a second locking lug upon an exterior diameter of the second housing. A locking mechanism including first and second protrusions which cooperate with the first and second locking lugs to couple the first and second housings at a first longitudinal joint, may also be provided.

In a particular embodiment, a hinge operable to couple the first and second housings at a second longitudinal joint may also be provided. In another embodiment, third a fourth indented regions associated with the first and second housings, respectively, may form third and fourth locking lugs on respective exterior diameters of the first and second housings. In this embodiment, a second locking mechanism having third and fourth protrusions which cooperate with the third and fourth locking lugs, respectively, to couple the first and second housings at a second longitudinal joint, may also be provided.

A restraint system may also be provided at an interior diameter of the first housing. In one embodiment, the restraint system may include at least one semi-circular insert disposed along the interior diameter. The insert may include a plurality of gripping teeth operable to engage the conduit when the conduit coupling is in an assembled position. In another embodiment, the restraint system may include a plurality of spikes extending from the interior diameter and operable to engage the conduit when the coupling is in an assembled position. In yet another embodiment, the restraint system may include at least one semi-circular gasket protruding from a notched opening within the interior diameter.

In a particular embodiment, the gripping teeth and/or spikes may extend toward a central portion of the interior diameter, and form an angle greater than 5 degrees with respect to a longitudinal central axis of the conduit coupling. In another embodiment, the gripping teeth and/or spikes may include respective points which extend approximately perpendicular to an axial central axis of the coupling. In still another embodiment, the points may extend toward an axial midpoint of the conduit coupling.

The present invention provides several technical advantages. For example, the coupling can resist very high longitudinal tension loads, as well as rotational loads. Thus, the coupling may be used in high load applications without the conduits becoming separated from the coupling. Accordingly, the cost and expense associated with constructing a conduit system are reduced.

Another technical advantage of the present invention is that the clamshell coupling is generally constructed from plastic materials that will not corrode. Accordingly, the operational life of the conduit system is longer, and the cost of the conduit system is reduced.

Still another technical advantage of the present invention is that the clamshell coupling can maintain a tight environmental seal between the clamshell coupling and the tubular members. Accordingly, the media within the conduit system cannot easily leak to the outside environment, and the outside environment cannot easily contaminate the media.

Yet another advantage is the couplings low profile that makes it easier to install in tight spaces and causes lower friction when pulling through a bore hole.

A further technical advantage of the present invention is that the clamshell coupling is easy to install and remove. Accordingly, the time and expense associated with constructing the conduit system are reduced.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like features, in which.

DETAILED DESCRIPTION OF THE INVENTION

The preferred embodiments of the present invention and its advantages are best understood by referring now in more detail to FIGS. 1–4 of the drawings, in which like numerals refer to like parts.

Throughout this description, the descriptive terms "originating" and "destination" are used to illustrate the operation of the various components. In practice, the components described as "originating" and "destination" typically performs originating and destination operations simultaneously. It will therefore be appreciated that the terms "originating" and "destination" are not intended to limit the scope of the present invention.

Figure 1:
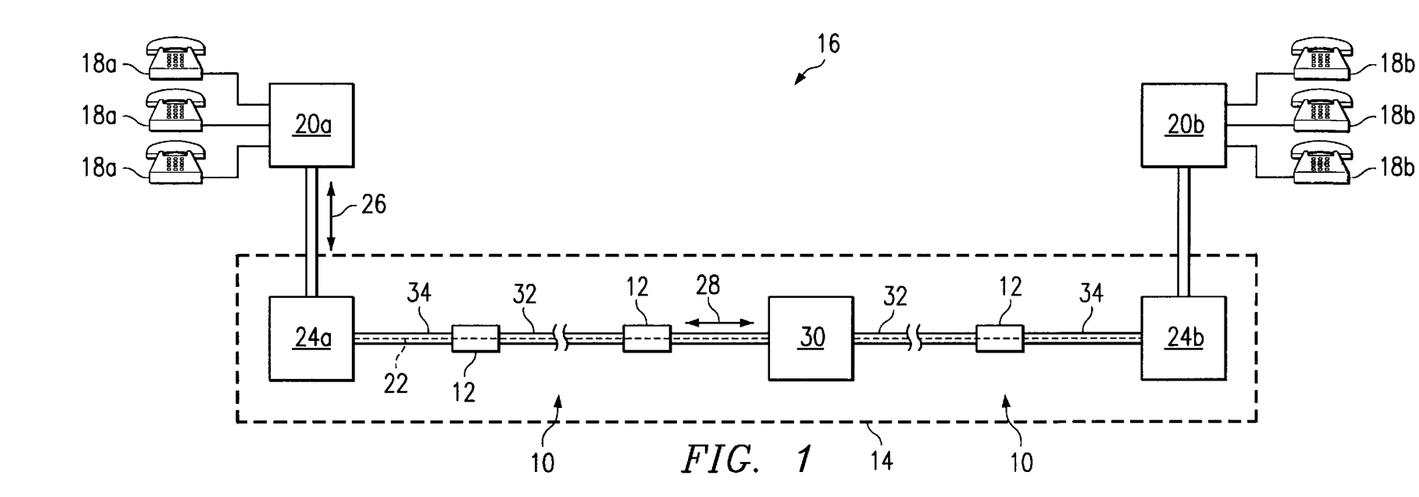
FIG. 1 is a schematic drawing in section illustrating a conduit system using a clamshell couplings in an optic fiber communication system in accordance with the present invention.

FIG. 1 is a schematic drawing in section illustrating a conduit system 10 incorporating a clamshell coupling 12. Conduit system 10 is illustrated as part of an optic fiber communication system 14 used in a telecommunication system 16. Clamshell coupling 12 may also be used in various other conduit systems that are used to communicate various other suitable medias and material. For example, conduit system 10 may be used for communicating various fluids (liquids and/or gases), wiring such as copper wire, twisted pairs, coaxial cable, and the like.

Telecommunication system 16 comprises a number of communication devices 18a, such as telephones, that are coupled to an originating switching system 20a. The originating switching system 20a is coupled to an originating point of the optic fiber communication system 14. A destination switching system 20b is coupled to a destination point of the optic fiber communication system 14. The destination switching system 20b is coupled to a number of communication devices 18b.

The switching systems 20a and 20b operate to route communication signals, i.e., telephone calls, from the originating communication devices 18a to the appropriate destination communication devices 18b. The optic fiber communication system 14 allows the communication signals to be transmitted between the originating switching system 20a and the destination switching system 20b at very high speeds and with a very large bandwidth, as compared to wireline systems. The optic fiber communication system 14 comprises at least one optic fiber 22 coupled between an originating optical interface 24a and a destination optical interface 24b. The optical interfaces 24a and 24b operate to convert electronic communication signals 26 into optical communication signals 28, and conversely, convert optical communication signals 28 into electronic communication signals 26.

In practice, a phone call may be placed from an originating communication device 18a to a destination communication device 18b. The originating switching system 20a receives the electronic communication signal 26 from the originating communication device 18a and routes the electronic communication signal 26 to the originating optical interface 24a. The originating optical interface 24a converts the electronic communication signal 26 into an optical communication signal 28 that is transmitted through the optic fiber 22 to the destination optical interface 24b. The optical interface 24b then converts the optical communication signal 28 into the electronic communication signal 26 that is routed to the destination switching system 20b. . The destination switching system 20b then routes the electronic communication signal 26 to the appropriate communication device 18b.

The optic fiber communication system 14 may also include one or more optical relays 30. The optical relay 30 operates to relay optical communication signals 28 through the optic fiber 22. Optical relays 30 are typically used when the length of optic fiber 22 is long and the quality of the optical communication signals 28 will degrade over the entire length of the optic fiber 22.

Conduit system 10 provides an environmentally secure protective shell that surrounds the optic fiber 22. As discussed previously, as a result of the superior operating capabilities of optic fiber communication systems 14, many wireline systems are being replaced with optic fiber communication systems 14 and new lines are often installed using optic fiber communication systems 14. Accordingly, thousands of miles of conduit systems 10 are being installed each year.

Conduit system 10 includes various sections of pipe, or conduits 32, 34. Conduit couplings 12 form a transition between associated sections of conduit, for example 32 and 34. Each conduit 32, 34 typically includes a smooth, constant exterior diameter. The connection between conduits 32, 34 and couplings 12 may be formed with mechanical couplings, adhesives, slip-fit, friction-fit, or electro-fusion, wherein couplings 12 and conduits 32, 34 are heated and melted together. Conduits 32, 34 may include innerduct, outerduct, or any combination thereof. Typically, outerduct refers to a conduit which carries one or more conduits or other medium therein. Innerduct refers to conduit and couplings carried within the outerduct. The teachings of the present invention are applicable to both inner and outer duct systems.

In practice, conduit system 10 may include any system provided for protection of any medium carried therein. Furthermore, conduit system 10 may be specifically designed to carry any solid medium as well as fluids, including liquids and gases. Conduit system 10 may maintain ambient pressure, or include a pressurized medium, for example a pressurized fire protection system for distributing water or fire resistant chemicals, or gases. In another embodiment, conduit system 30 may be designed for gravity flow systems, including waste-water distribution and disposal systems.

Conduits 32 and 34, and therefore, clamshell coupling 12 may be provided in a variety of different sizes, within the teachings of the present invention. For example only, and not by way of limitation, for applications in which conduits 32 and 34 form innerduct, typical sizes include 1-¼ inch, 1-½ inch, and two inch diameter sections. For applications where conduits 32 and 34 serve as outerduct, typical sizes include four to twelve inch outer diameter sections.

Conduits 32, 34 and couplings 12 may include any type of pipe grade metal, plastic, or composite material. Examples include polyvinyl chloride (PVC), high density polyethylene (HDPE), and glass filled HDPE. Various metal conduit materials are also available and include aluminum, copper, carbon-steel and other metal alloys.

Figure 2A:
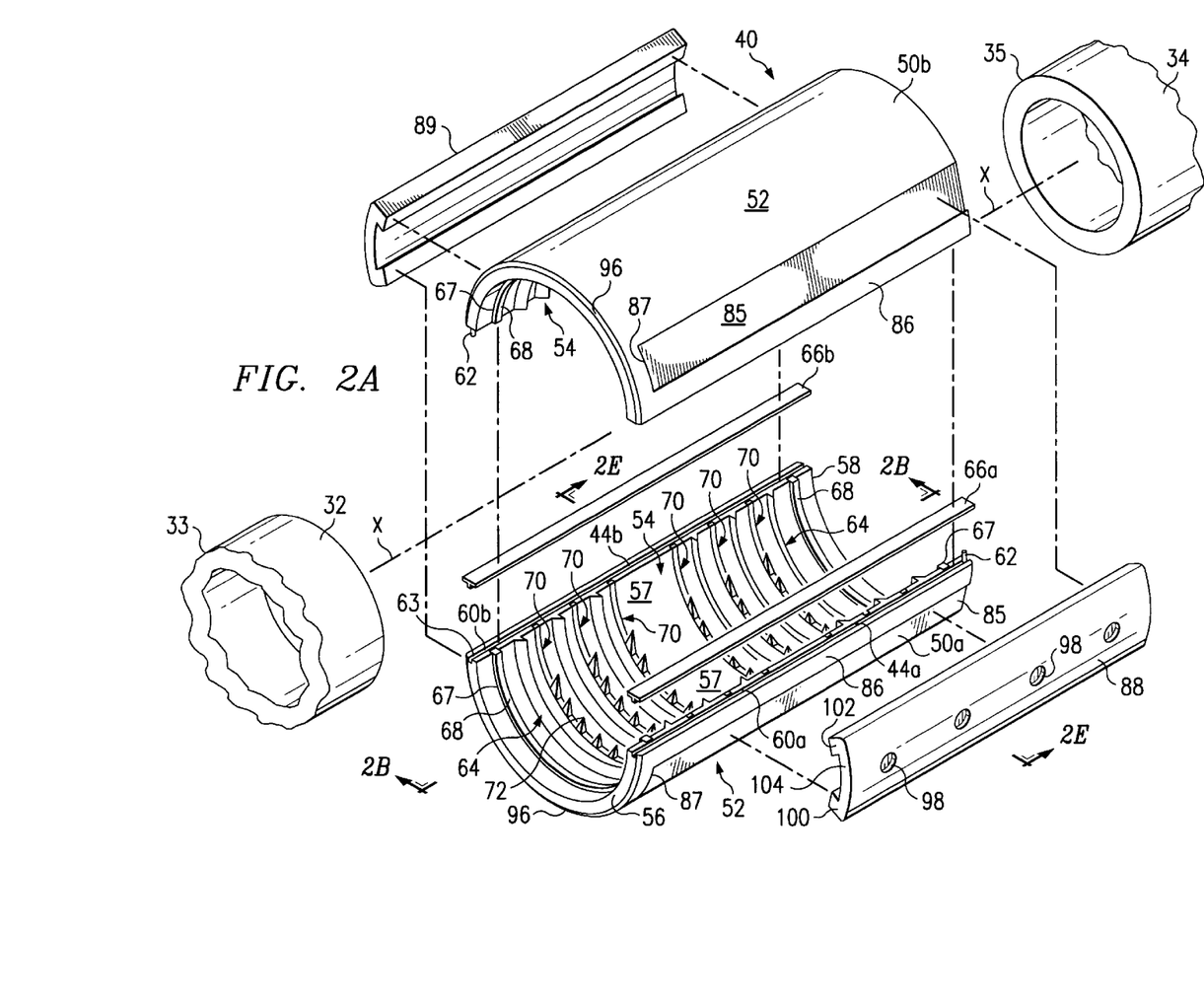
FIG. 2A is an exploded orthographic drawing illustrating a clamshell coupling in accordance with the present invention.

One particular type of conduit coupling 12 suitable for joining adjacent sections of conduit 32 and 34 is illustrated in more detail in FIG. 2A, and generally designated by the reference numeral 40. Clamshell coupling 40 is one type of coupling which may be used to couple together and/or repair damaged sections of conduits 32 and/or 34, without effecting the installed optic fibers 22.

Coupling 40 includes a first longitudinal housing 50a and a second longitudinal housing 50b. In the illustrated embodiment housings 50a and 50b are corresponding mirrored images of one another. For illustrative purposes, primarily longitudinal housing 50a will be described in detail, since much of longitudinal housing 50b is hidden from view. It will be recognized by those skilled in the art that longitudinal housings 50a and 50b need not contain identical, mirrored image attributes, within the teachings of the present invention. A few examples of the many acceptable deviations from the configurations of longitudinal housings 50a and 50b of FIG. 2A, will be described later in more detail.

Longitudinal housings 50a and 50b are generally complementary in that they fit together to form a circumferential collar surrounding a portion of outer diameters 33 and 35 of conduits 32 and 34, respectively. Longitudinal housings 50a and 50b may be coupled together at a first longitudinal joint 60a and a second longitudinal joint 60b of housing 50a. Clamshell coupling 40 may include an alignment system that operates to align the longitudinal housings 50a and 50b. In the illustrated embodiment, the alignment system includes a complementary pin 62 and boss 63 arrangement on a longitudinal housings 50a and 50b. Each pin 62 has a corresponding boss 63 which engage each other when longitudinal housings 50a and 50b are properly aligned for installation. It will be understood that the alignment system may include other alignment devices without departing from the scope of the present invention.

Figure 3A:
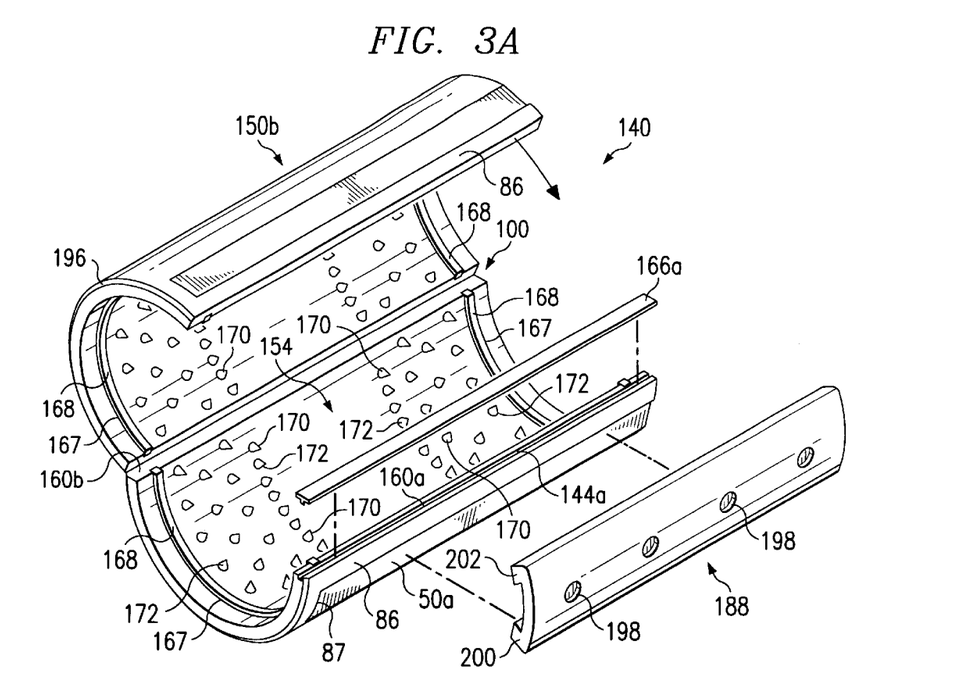
FIG. 3A is an orthographic drawing of a clamshell coupling in accordance with another embodiment of the present invention.

Clamshell coupling 40 also includes a pair of identical slidable locking mechanisms 88 and 89. Locking mechanisms 88 and 89 cooperate with first and second longitudinal housings 50a and 50b to secure housings 50a and 50b together and/or to secure longitudinal housings 50a and 50b around outer diameters 33 and 35 of conduits 32 and 34, respectively. Slidable locking mechanisms 88 and 89 need not be identical in configuration and/or operation in order to secure longitudinal housings 50a and 50b, within the teachings of the present invention. For example, housings 50a and 50b may be assembled using a hinge and a single slidable locking mechanism 188, as illustrated in FIG. 3A.

Longitudinal membrane gaskets 66a and 66b may also be provided at each of first and second longitudinal joints 60a and 60b. Membrane gaskets 66a and 66b generally include rubber-type seals disposed within grooves 44a and 44b, and cooperate to enhance a fluid-tight seal between longitudinal housings 50a and 50b, to prevent a breach of the seal between the interior of conduits 32 and 34 and ambient environment. In another embodiment, gaskets 66a and 66b may include flat smooth surfaces molded into longitudinal joints 60a and 60b that act as a seal between the clamshell coupling 40 and conduits 32 and 34. It will be understood that gaskets 66a and 66b may include other suitable sealing devices without departing from the scope of the present invention. Many suitable alternatives exist capable of forming this seal between longitudinal housings 50a and 50b. For example, longitudinal housings 50a and 50b may be treated with a liquid sealer, prior to assembly. In the embodiment illustrated in FIG. 2A, longitudinal membrane gaskets 66a and 66b are formed of a buna material. Other suitable materials, for example compressible metals, plastics, and composites may be used in the alternative. Gaskets 66a and 66b may be selected from a group of materials capable of maintaining their sealing properties under adverse environmental conditions.

Longitudinal housings 50a and 50b may be fabricated from a plastic material that is semi-transparent. The semi-transparency of longitudinal housings 50a and 50b allow a user to visually verify that conduits 32 and 34 are adequately engaged to prevent a gap between conduits 32 and 34 which may cause an obstruction, or breach in conduit system 10. Additionally, a practitioner may view outer diameters 33 and 35, as well as interior diameter 54 through clamshell coupling 40 to verify that no burrs or other obstructions are present which will jeopardize the fluid-tight seal and/or the integrity of the structural coupling between housings 50a, 50b and conduits 32 and 34. In the illustrated embodiment, components of clamshell coupling 40 may be fabricated from an Acetal copolymer, or other high modulus plastic material. Accordingly, coupling 40 includes the benefit of corrosion and chemical resistance, which extends the operating life of coupling 40. Other materials suitable for use in the fabrication of components of conduit coupling 40 include plastics, such as rigid or plasticized PVC, polyethylene, and HDPE. Components of clamshell coupling 40 may also be fabricated from various other plastics, metals, and composites, within the teachings of the present invention.

Longitudinal housing 50a generally includes an elongate, semi-cylindrical, semi-tubular configuration, having an exterior diameter 52, an interior diameter 54, and first and second ends 56 and 58, respectively. Interior diameter 54 generally corresponds with exterior diameters 33 and 35 of conduits 32 and 34, respectively. First and second ends 56 and 58, of housings 50a and 50b are each adapted to receive, and may be coupled with conduits 32 and 34. Exterior diameter 52 includes an indented region 85 which extends from second end 58 toward first end 56, terminating at a dead stop 87. Indented region 85 forms a locking lug 86 along exterior diameter 52 which cooperates with slidable locking mechanism 88 to secure longitudinal housings 50a and 50b, and slidable locking mechanism 88 together. It will be recognized by those skilled in the art that indented region 85, lug 86 and slidable locking mechanism 88 may include various configurations within the teachings of the present invention.

In order to assemble longitudinal housings 50a and 50b upon conduits 32 and 34 the following steps may be followed in almost any order. Gaskets 66a and 66b may be installed within their respective grooves 44a and 44b. Conduits 32 and 34 may be placed together in order to form a continuous conduit with a single joint at the transition between conduits 32 and 34. First longitudinal housing 50a may be placed along the outer diameters 33 and 35 of conduits 32 and 34, respectively, such that the transition between conduits 32 and 34 occurs at the approximate longitudinal midpoint of longitudinal housing 50a, within a central portion 57 of housing 50a. Pins 62 and bosses 63 may be used to align second longitudinal housing 50b with longitudinal housing 50a such that longitudinal housing 50b covers a portion of outer diameters 33 and 35, and the transition between conduits 32 and 34 occurs at the approximate longitudinal midpoint of longitudinal housing 50b. Slidable locking mechanisms 88 and 89 may then be installed to secure clamshell coupling 40 upon conduits 32 and 34.

Slidable locking mechanism 88 includes first and second protrusions 100 and 102 which cooperate with locking lugs 86 of housings 50a and 50b to secure slidable locking mechanism 88 in place. After assembling housings 50a and 50b, as described above, a first end 104 of locking mechanism 88 may be installed at second end 58 of housing 50a. First protrusion 100 may be manipulated within indented region 85 such that first protrusion 100 cooperates with locking lug 86 of housing 50a. Similarly, second protrusion 102 may be manipulated within indented region 85 of housing 50b such that second protrusion 102 cooperates with locking lug 86 of housing 50b to secure locking mechanism 88. Locking mechanism 88 may then be slidably installed and forced toward first end 56, until first end 104 contacts dead stop 87. Alternatively, locking mechanism 88 may be snapped directly into place over lugs 86, without having to slide locking mechanism 88.

Dead stops 87 prevent the lateral movement of mechanisms 88 and 89, with respect to housings 50a and 50b beyond that required to form a suitable coupling therebetween. Dead stop 87 prevents locking mechanism 88 from sliding too far toward first end 56. When properly installed, first protrusion 100 and second protrusion 102 cooperate with locking lugs 86 of housings 50a and 50b, respectively, to secure locking mechanism 88 in place, and to secure housings 50a and 50b together at longitudinal joint 60a. Slidable locking mechanism 89 may be installed in a similar manner to secure locking mechanism 89 in place adjacent second longitudinal joint 60b, and to secure housings 50a and 50b together at joint 60b. One advantage to the use of locking mechanism 88 and 89 includes an even distribution of force. For example, when a force is exerted upon locking mechanisms 88 or 89, or clamshell coupling 40, the force is evenly distributed across seals 66a and 66b, along joints 60a and 60b. Prior art mechanical fasteners used to secure longitudinal housings caused point loading along joints 60a and 60b, which lead to failure and leaks.

Slidable locking mechanisms 88 and 89 may engage substantially the full length of the longitudinal locking lugs 86, and operate to clamp and secure longitudinal housings 50a and 50b to conduits 32 and 34. Slidable locking mechanisms 88 and 89 include the advantage of a small cross sectional profile that allows clamshell coupling 40 to be pulled through a restrictive passage with minimal difficulty. It will be understood that the coupling system 58 may comprise other suitable fastening devices without departing from the scope of the present invention. Suitable alternatives will be described later in more detail.

Longitudinal housings 50a and 50b generally include a chamfer 96 on each end 56 and 58 which extend along longitudinal locking lugs 86. Chamfer 96 allows clamshell coupling 40 to be pulled through the installation equipment without becoming snagged on the installation equipment or other materials. Chamfer 96 also allows clamshell coupling 40 to be pulled through restrictive passages with less resistance than conventional couplings. Furthermore, chamfer 96 allows locking mechanisms 88 and 89 to be installed more easily, without sharp edges to snag locking mechanisms 88 and 89 during installation.

In practice, longitudinal housings 50a and 50b may be initially secured together over conduits 32 and 34 using a wrench (not expressly shown). Using the wrench, slidable locking mechanisms 88 and 89 slide relatively easily over longitudinal locking lugs 86. If a wrench is not available, slidable locking mechanisms 88 and 89 may be hammered into place without substantial damage to locking mechanisms 88 or 89, or longitudinal locking lugs 86. Slidable locking mechanisms 88 and 89 may also include detents 98 that allow a tool to be inserted into the detents 98 and used to forcibly slide locking mechanisms 88 and 89 into position over longitudinal locking lugs 86. Installation of locking mechanisms 88 and 89 forces longitudinal housings 50a and 50b and their associated restraint systems (to be described later, in more detail) to actively engage conduits 32 and 34. Conduits 32 and 34 are secured within clamshell coupling 40 and will resist being dislodged from clamshell coupling 40 under very high longitudinal tensile loads or rotational loads.

Interior diameter 54 is generally uniform and smooth along the entire longitudinal length of housing 50a, between first end 56 and second end 58. Longitudinal housing 50a also includes a number of restraint systems at interior diameter 54 which enhance the seal between coupling 40 and conduits 32 and 34, and increase the strength of the connections therebetween. The restraint systems actively engage conduits 32 and 34 to prevent conduits 32 and 34 from becoming disengaged from clamshell coupling 40.

Figure 2B:
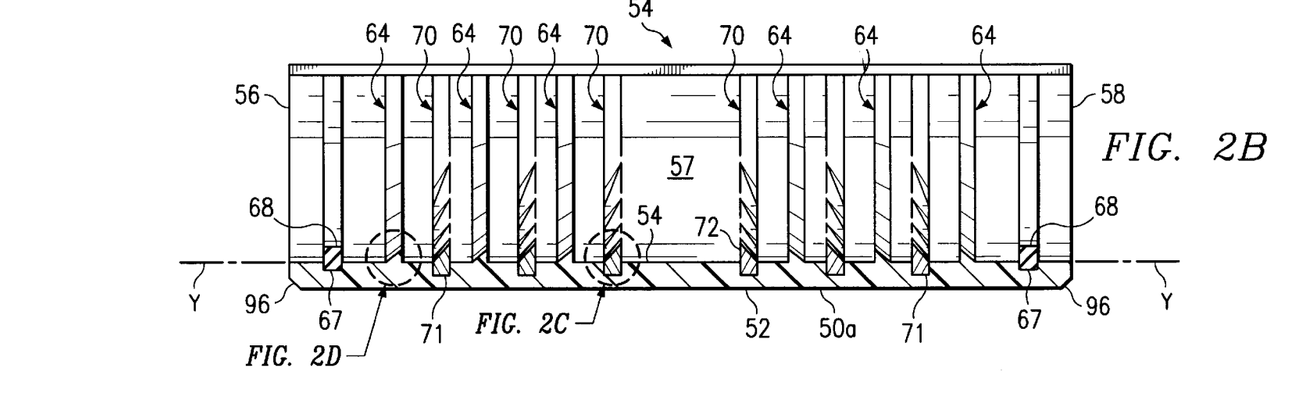
FIG. 2B is a schematic drawing illustrating a cross section of a portion of the clamshell coupling of FIG. 2A taken along lines 2B—2B, in accordance with the present invention.
Figure 2C:
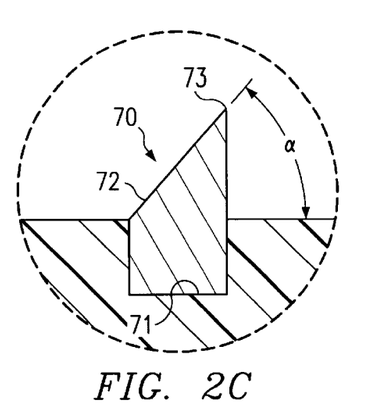
FIG. 2C is a schematic drawing in section, illustrating a partial cross-section of an insert, in accordance with one aspect of the present invention.

Referring to FIGS. 2A–2C, restraint systems associated with interior diameter 54 may include semi-circular inserts 70 of teeth 72, circular ribs 64, and/or semi-circular gaskets

68. First end 56 of housing 50a includes a notched opening 67 operable to recess a semi-circular gasket 68. Similarly, second end 58 includes a second notched opening 67 to receive a second gasket 68. Corresponding notched openings 67 and gaskets 68 may also be located at each of first and second ends 56 and 58 of housing 50b. Semi-circular gaskets 68 enhance the fluid-tight seal formed between conduits 32 and 34, and longitudinal housings 50a and 50b. Each gasket 68 is appropriately sized to protrude from its respective notched opening 67, an appropriate amount to form a friction fit between the outer diameters 33 and 35 of conduits 32 and 34, and clamshell coupling 40. The friction fit enhances the fluid-tight seal, and provides additional strength to the connection to prevent the inadvertent separation or coupling 40 from conduits 32 and 34. When properly assembled, each gasket 68 of housing 50a contacts and cooperates with a corresponding gasket 68, associated with housing 50b to form a continuous cylindrical, tubular, fluid-tight seal. Gasket 68 may be provided along interior diameter 54 of housings 50a and 50b. Gasket 68 may be compressed between exterior diameters 33 and 35 of conduits 32 and 34, respectively, and interior diameter 54, in order to insure a proper seal between conduits 32 and 34, and clamshell coupling 40. This prevents any media contained within conduits 32 and 34 from escaping to the ambient environment, and also prevents ambient contaminates from entering conduit system 30. A proper seal between conduits 32 and 34, and clamshell coupling 40 may be beneficial for any application requiring pressure differentials between the interior of conduits 32 and 34 and ambient environment. For example, in order to install fiber optic cables within conduits 32 and 34, conduits 32 and 34 may be pressurized as fiber optic cables are "blown" through conduits 32 and 34.

Materials used to fabricate gasket 68 may be selected according to specific criteria, including their resistance to chemical and ultraviolet exposure. In the illustrated embodiment, gasket 68 may be fabricated from silicon. Many other materials may be used to fabricate gasket 68, including various elastomeric and/or compressible materials.

The number, size, shape and configuration of notched openings 67 and gaskets 68 may be significantly modified within the teachings of the present invention. For example, additional notched openings and corresponding gaskets may be located adjacent first end 56, second end 58, or within central portion 57, as desired. In another application, gaskets could be attached to outer diameters 33 and 35 of conduits 32 and 34, prior to installation of clamshell coupling 40. Alternatively, gaskets could be pre-installed upon or attached to interior diameter 54 prior to assembly of coupling 40. In either case, notched openings 67 would not necessarily be required. For example, gasket 68 could be attached to housing 50a with an adhesive, or mechanical connectors.

In yet another embodiment, gasket 68 could be molded within interior diameter 54 during the molding process. In this embodiment, gasket 68 may be formed of material similar to housing 58, or any other material described within this specification. In this embodiment, gasket 68 may function similar to circular ribs 64, which are described in more detail below.

Interior diameter 54 also includes a plurality of circular ribs 64. In the illustrated embodiment, central portion 57 separates a total of three circular ribs at first end 56 of housing 50a, and three circular ribs at second end 58 of housing 50a. Housing 50b includes a similar configuration of circular ribs 64. The number, size, shape and configuration of ribs 64 may be significantly modified within the teachings of the present invention.

Figure 2D:
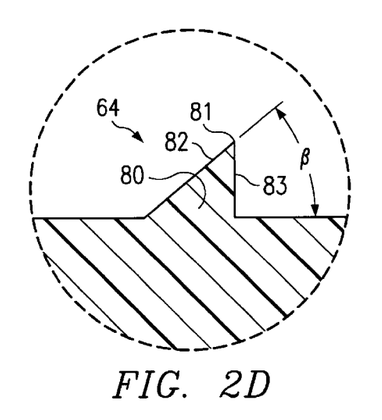
FIG. 2D is a schematic drawing in section, illustrating a partial cross-section of semi-circular rib, in accordance with another aspect of the present invention.
Figure 2E:
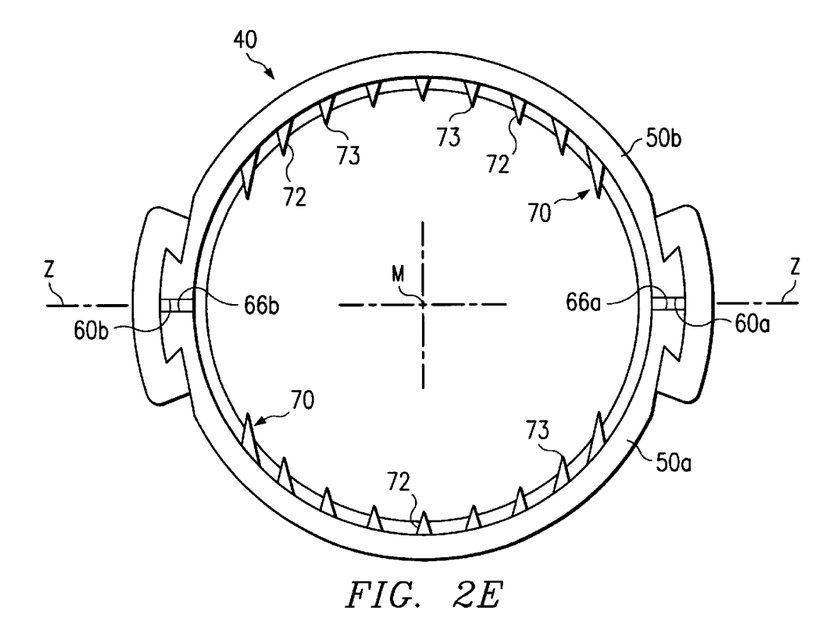
FIG. 2E is a schematic drawing illustrating an assembled end view of the clamshell coupling of FIG. 2A in accordance with the present invention.

The plurality of circular ribs 64 enhance the strength of the connection between conduits 32 and 34 and longitudinal housing 50a. Circular ribs 64 each include teeth 80 which form sharp points 81 which are operable to effectively engage conduits 32 and 34. Each tooth 80 is configured to have a front face 82 which forms a greater angle with respect to an axis Y, drawn through the base of each tooth 80, than does its rear face 83. In the illustrated embodiment, rear face 83 extends generally perpendicular to axis Y. Conversely, front face 82 extends at an angle β with respect to axis Y. In one embodiment, β may be between five and forty-five degrees, for example, approximately equal to 30 degrees. In this type of application, sharp point 81 and the configuration of front face 82 and rear face 83 allow a tighter grip of clamshell coupling 40 upon conduits 32 and 34.

In the illustrated embodiment of FIG. 2B, first end 56 includes a plurality of semi-circular ribs 64 which extend along a plane approximately perpendicular to central axis X. Axis Y may be parallel to axis X. In another embodiment, axis Y may be at an offset to axis X. Alternatively, ribs 64 may be configured to form a single continuous thread along a portion of, or the entirety of interior diameter 54 at first end 56. In another embodiment a continuous thread could extend any portion of, or the entirety of interior diameter 54 between first end 56 and second end 58.

As previously discussed, circular ribs 64 disposed along interior diameter 54 include teeth 80. In this manner, in their respective assembled positions, first longitudinal housing 50a and second longitudinal housing 50b form a friction fit with conduit 32, and teeth 80 which may function to bite or grab conduit 32, prevent the decoupling of clamshell coupling 40 from conduits 32 and 34. Once assembled, clamshell coupling 40 may also be press-fit upon conduit 32 and/or 34, and/or a press-fit type connection may be used to enhance the coupling between clamshell coupling 40 and conduit 32 and/or 34 after clamshell coupling 40 is assembled upon conduit 32 and/or 34.

Teeth 80 at first end 56 generally point toward central portion 57. Similarly, teeth 80 at second end 58 point towards central portion 57. This orientation prevents conduits 32 and 34 from sliding toward first end 56 and second end 58, respectively. In another embodiment, circular ribs could be configured differently, with smooth, rounded edges for example, within the teachings of the present invention.

In the illustrated embodiment, ribs 64 are formed within interior diameter 54 during the molding process. Alternatively, notched openings could be molded into interior diameter 54 during the molding process and ribs 64 could be independently press-fit into interior diameter 54 prior to assembly of coupling 40, similar to inserts 70, which are described below.

Interior diameter 54 also includes a plurality of notched openings 71 operable to recess and secure a plurality of semi-circular inserts 70. In one embodiment, notched openings 71 may be formed within interior diameter 54 during the molding process. In the same embodiment, inserts 70 may be "pre-fit" within notched openings 71 prior to assembly of clamshell coupling 40. In the illustrated embodiment, three inserts 70 are located at first end 56 of housing 50a and three inserts 70 are located at second end 58 of housing 50a. Similarly, three inserts 70 are located at each end 56 and 58 of housing 50b. The number, size, shape and configuration of inserts 70 may be significantly modified, within the teachings of the present invention.

Inserts 70 include a row of gripping teeth 72, configured to cooperate with exterior diameters 33 and 35 of conduits 32 and 34, respectively, to hold conduits 32 and 34 securely in place within coupling 40. Gripping teeth 72 may be provided of various sizes within the same coupling 40, as illustrated in FIG. 2C. Each tooth 72 culminates in a point 73 which extends from interior diameter 54 toward central axis X. As best shown in FIG. 2C, teeth 72 may be configured such that points 73 extend approximately perpendicular to central axial axis Z—Z. This configuration prevents axial rotation of conduits 32 and 34 within coupling 40. In another embodiment, teeth 72 may be configured such that all points 73 extend toward an imaginary midpoint M.

Inserts 70, teeth 72 and points 73 are also configured such that points 73 extend toward central portion 57 of interior diameter 54. For example, teeth 72 may extend toward central portion 57 such that teeth 72 form an angle with respect to axis Y. may be between five and forty-five degrees, for example thirty degrees. Accordingly, teeth 72 engage conduits 32 and 34 to prevent the decoupling of conduits 32 and 34, and coupling 40.

In particular, teeth 72 and points 73 operate by penetrating outer diameters 33 and 35 of conduits 32 and 34, respectively. Teeth 72 may penetrate approximately 25–75% into the wall of conduits 32 and 34. Similarly, teeth 80 may be configured such that they penetrate approximately 25–75% into the walls of conduits 32 and 34. This prevents conduits 32 and 34 from separating from clamshell coupling 40 under very high longitudinal tension loads. Some embodiments of clamshell coupling 40 may withstand a larger longitudinal tensile load than conduits 32 and 34. In other words, when being pulled apart, conduits 32 and/or 34 may fracture under a tensile load without conduits 32 and 34 being pulled out of clamshell coupling 40. This type of connection may also operate to resist a rotational load between conduits 32 and 34 and clamshell coupling 40.

Inserts 70 may be generally arranged in concentric rows along interior diameter 54. In the illustrated embodiment of FIGS. 2A–2C, inserts 70 have a generally semi-circular shape with individual teeth 72 formed on the internal diameter of the insert 70. In another embodiment to be discussed with respect to FIG. 3A, the inserts 70 may have the general shape of conical spikes. Inserts 70 may be integrally molded into interior diameter 54, assembled separately into corresponding cavities within interior diameter 54, or otherwise suitably secured to interior diameter 54. Inserts 70 may also be fabricated from any plastic, metal or composite material.

Clamshell coupling 40 may also be used to repair damage to any particular conduit, for example conduit 32, without damaging optic fibers 22 contained within conduit 32. Clamshell coupling 40 may be installed over a damaged portion of conduit 32 in a similar manner as described above. Clamshell coupling 40 forms a seal around the damaged portion of conduit 32, and also structurally strengthens conduit 32 to prevent further damage.

FIG. 3A is an orthographic drawing of a clamshell coupling 140 in accordance with another embodiment of the present invention. Clamshell coupling 140 may be used in a similar manner to coupling 40, described above. In this embodiment, a hinge mechanism 200 may form a coupling between longitudinal housings 50a and 50b, and may comprise a thin membrane that connects the longitudinal housings 50a and 50b. It will be understood that hinge mechanism 200 may comprise other suitable mechanisms without departing from the scope of the present invention.

Hinge mechanism 200 forms an at least partially fluid-tight seal between housings 150a and 150b at a longitudinal joint 160b. A longitudinal membrane gasket 166a may be recessed within groove 144a prior to assembly of clamshell coupling 140. Gasket 166a enhances the fluid-tight seal between housings 150a and 150b at longitudinal joint 160a. In an alternative embodiment, a gasket may also be provided at longitudinal joint 160b. Only a single slidable locking mechanism 188 is necessary to firmly and securely couple housings 150a and 150b in their respective installed positions. Locking mechanism 188 may also include first and second protrusions 202 and 204, and detents 198, all of which function similarly to their corresponding components of FIGS. 2A–2C.

Clamshell coupling 140 also includes a number of restraint systems at its interior diameter 154. Interior diameter 154 includes notched openings 167 and gaskets 168, which function similarly to their corresponding components of clamshell coupling 40 of FIGS. 2A–2C. Instead of circular ribs 64 and inserts 70, as illustrated in FIG. 2B, clamshell coupling 140 includes a plurality of spikes 170 which enhance the coupling between conduits 32 and 34, and clamshell coupling 140.

Spikes 170 may be arranged within interior diameter in a pattern which will maximize the strength of the coupling between clamshell coupling 140 and conduits 32 and 34. One possible configuration of spikes 170 within interior diameter 154 is illustrated in FIG. 3A. It will be recognized by those skilled in the art that the number, size, configuration, type and layout of spikes 170 within interior diameter 154 may be significantly modified within the teachings of the present invention. For example, spikes 170 may be laid out to form concentric circles within interior diameter 154 in a similar manner as inserts 70 and teeth 72 are arranged in FIG. 2B.

Figures 3B, 4:
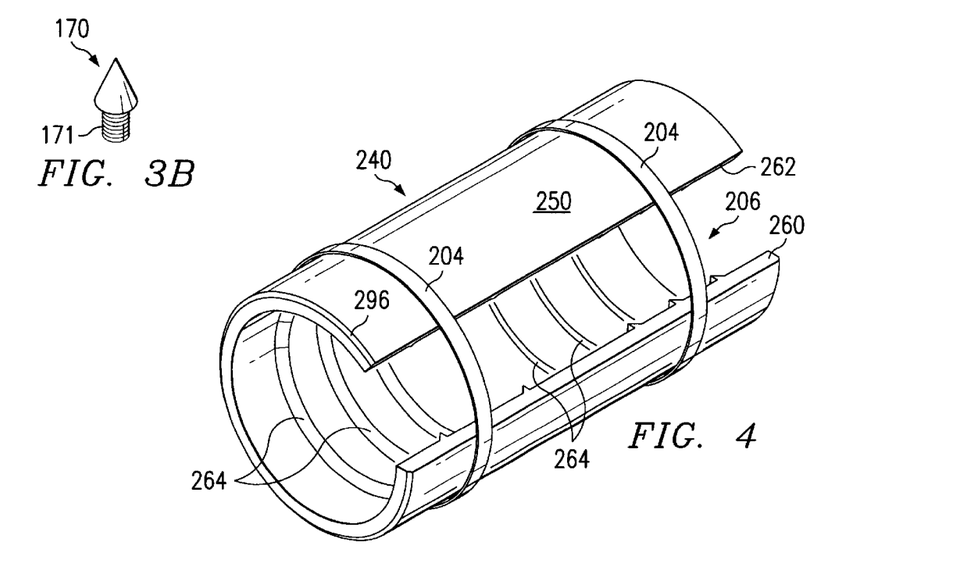
FIG. 3B is a schematic drawing in section, illustrating a spike, in accordance with one aspect of the present invention.
FIG. 4 is an orthographic drawing of a clamshell coupling in accordance with another embodiment of the present invention.

For illustrative purposes, an enlarged spike 170 is illustrated in more detail in FIG. 3B. In the illustrated embodiment, spikes 170 are generally conical. In another embodiment, spikes 170 may be provided or various shapes and sizes. Any protrusion which extends from interior diameter 154 and operable to engage a section or conduit when clamshell coupling 140 is in an assembled position is suitable for use within the teaching of the present invention. Spike 170 may include a threaded stem 171 which provides a means to secure spike 170 within interior diameter 154. Accordingly, interior diameter 154 may include a plurality of corresponding openings 172. Spikes 170 may be threaded into openings 172. Openings 172 may be pre-threaded to accept threaded stem 171. Alternatively, threaded stem 171 may be provided of the "self-tapping" type to allow simplified installation of spikes 170 within openings 172. In this embodiment, openings 172 need not necessarily include corresponding threads.

In still another embodiment, openings 172 may be provided approximately the same diameter as threaded stem 171. In this embodiment, spikes 170 may be press-fit into openings 172. Alternatively, spikes 170 may be incorporated into interior diameter 154 during the molding process, eliminating the necessity to install spikes 170 after fabrication of housings 150a and 150b.

FIG. 4 is an orthographic drawing of a clamshell coupling 240 in accordance with another embodiment of the present invention. Clamshell coupling 240 may function similarly to clamshell coupling 40 of FIGS. 2A–2C. Clamshell coupling 240 includes a single longitudinal housing 250 and a tension coupling system 204. Longitudinal housing 250 includes a generally cylindrical, generally tubular configuration. Housing 250 may be fabricated from a flexible material as described with regard to clamshell coupling 40. A longitudinal gap 206 within housing 250 allows longitudinal housing 250 to be installed around exterior diameters 33 and 35 of conduits 32 and 34, respectively. When longitudinal housing 250 is installed over conduits 32 and 34, tension coupling system 204 may be tightened to clamp housing 250 securely around conduits 32 and 34.

Tension coupling system 204 comprises a number of tension straps 205 that circumferentially surround the single piece longitudinal housing 250 that can be tightened to secure the clamshell coupling 240 to conduits 32 and 34. In practice, clamshell coupling 240 may be particularly suited for repairing minor damage in conduits 32 and 34.

As illustrated in FIG. 4, clamshell coupling 240 may include a plurality of circular ribs 264. Ribs 264 are configured similar to and function similar to ribs 64 of clamshell coupling 40. Ribs 264 may extend along the entire interior diameter 254, to enhance the fluid-tight seal between conduits 32 and 34, and clamshell coupling 240. When properly installed, gap 206 may partially or totally close, such that longitudinal surface 260 contacts longitudinal surface 262. Clamshell coupling 240 may also incorporate chamfer 296 which is configured similarly to and functions similarly to chamfer 96 of clamshell coupling 40 (see FIG. 2A).

Interior diameter 254 may also incorporate inserts 70, spikes 170 and/or gaskets 68, as described previously within this specification. It will be recognized by those skilled in the art that the various configurations of clamshell couplings 40, 140 and 240 may incorporate any of the various features described with respect to one another, including pins, bosses, circular ribs, gaskets, inserts, teeth, slidable locking mechanisms, hinges and locking lugs. In addition, regarding configurations which incorporate two housings, each housing may incorporate one or all of these features without regard to the features present on the corresponding housings.

The clamshell couplings described above provide significant advantages. The quality of the seals formed between housings and conduits reduce costs spent troubleshooting leaks. In addition, the reduced size, weight and profile of the couplings enhances their maneuverability during installation, particularly in confined spaces. The reduced size and profile also causes reduced friction during installation of conduits, particularly when conduits are pulled through a bore hole. Furthermore, assembly of the couplings is simplified in contrast to prior couplings which utilize bolted and/or threaded connections.

Although the present invention has been described in several embodiments, various changes and modifications may be suggested to one skilled in the art. It is intended that the present invention encompass such changes and modifications that fall within the scope of the appended claims.

What is claimed is:

1. A conduit coupling, comprising:
a first, semi-tubular housing having a first interior surface, a first exterior surface and first and second ends;
the first and second ends adapted to receive at least one section of conduit;
the first housing having at least a first indented region forming a first locking lug upon the first exterior surface;
a second semi-tubular housing complementary to the first housing, the second housing having a second interior surface and a second exterior surface;
the second housing having at least a second indented region forming a second locking lug upon the second exterior surface;
a first locking mechanism having first and second protrusions which cooperate with the first and second locking lugs to couple the first and second housings at a first longitudinal joint;
at least one semi-circular rib disposed upon the first interior surface; and
wherein the at least one semi-circular rib further comprises:
a front face and a rear face forming a sharp point of a tooth, the tooth extending toward a central portion of the coupling;
the rear face approximately perpendicular to a longitudinal central axis of the coupling; and
the front face oriented at an angle between five and forty-five degrees with respect to the longitudinal central axis.

2. A conduit coupling, comprising:
a first, semi-tubular housing having a first interior surface, a first exterior surface and first and second ends;
the first and second ends adapted to receive at least one section of conduit;
the first housing having at least a first indented region forming a first locking lug upon the first exterior surface;
a second semi-tubular housing complementary to the first housing, the second housing having a second interior surface and a second exterior surface;
the second housing having at least a second indented region forming a second locking lug upon the second exterior surface;
a first locking mechanism having first and second generally parallel protrusions which cooperate with the first and second locking lugs to couple the first and second housings at a first longitudinal joint; and
at least one semi-circular insert disposed along the first interior surface, the insert including a plurality of gripping teeth operable to engage the at least one section of conduit, when the conduit coupling is in an assembled position.

3. The conduit coupling of claim 2, wherein the gripping teeth each include a respective point which extends perpendicular to an axial central axis of the conduit coupling.

4. A conduit coupling, comprising:
a first, semi-tubular housing having a first interior surface, a first exterior surface and first and second ends;
the first and second ends adapted to receive at least one section of conduit;
the first housing having at least a first indented region forming a first locking lug upon the first exterior surface;
a second semi-tubular housing complementary to the first housing, the second housing having a second interior surface and a second exterior surface;
the second housing having at least a second indented region forming a second locking lug upon the second exterior surface;
a first locking mechanism having first and second protrusions which cooperate with the first and second locking lugs to couple the first and second housings at a first longitudinal joint;
at least one semi-circular insert disposed along the first interior surface, the insert including a plurality of gripping teeth operable to engage the at least one section of conduit, when the conduit coupling is in an assembled position; and wherein the gripping teeth extend toward a central portion of the conduit coupling, and form an angle between five and forty-five degrees with respect to a longitudinal central axis of the conduit coupling.

5. A conduit coupling, comprising:

a first, semi-tubular housing having a first interior surface, a first exterior surface and first and second ends;

the first and second ends adapted to receive at least one section of conduit;

the first housing having at least a first indented region forming a first locking lug upon the first exterior surface;

a second semi-tubular housing complementary to the first housing, the second housing having a second interior surface and a second exterior surface;

the second housing having at least a second indented region forming a second locking lug upon the second exterior surface;

a first locking mechanism having first and second protrusions which cooperate with the first and second locking lugs to couple the first and second housings at a first longitudinal joint;

at least one semi-circular insert disposed along the first interior surface, the insert including a plurality of gripping teeth operable to engage the at least one section of conduit, when the conduit coupling is in an assembled position; and wherein the gripping teeth each include a respective point which extends toward an axial midpoint of the conduit coupling.

6. A conduit coupling comprising:

a first longitudinal housing having a first interior surface;

a second longitudinal housing, complementary to the first longitudinal housing and operable to be coupled with the first longitudinal housing for installation upon at least a first conduit;

a first locking mechanism having first and second generally parallel protrusions which cooperate with first and second locking lugs associated with the first and second housings, respectively, to couple the first and second housings at a first longitudinal joint;

the first longitudinal housing including at least one restraint system disposed upon the first interior surface; and wherein the restraint system comprises at least one semi-circular insert disposed along the first interior surface, the insert including a plurality of gripping teeth operable to engage the sections of conduit when the conduit coupling is in an assembled position.

7. The conduit coupling of claim 6, wherein the gripping teeth each include a respective point which extends perpendicular to an axial central axis of the conduit coupling.

* * * * *